Feb. 2, 1971 A. W. GROBIN, JR 3,560,210
METHOD OF RECORDING A PLURALITY OF HOLOGRAMS AND
SEPARABLE EMULSION EXPOSURE PACKAGE THEREFOR
Filed Jan. 13, 1967

INVENTOR
ALLEN W. GROBIN, JR.
ATTORNEY 3,560,210
METHOD OF RECORDING A PLURALITY OF
HOLOGRAMS AND SEPARABLE EMULSION
EXPOSURE PACKAGE THEREFOR
Allen W. Grobin, Jr., Poughkeepsie, N.Y., assignor to International Business Machines Corporation, Armonk, N.Y., a corporation of New York
Filed Jan. 13, 1967, Ser. No. 609,203
Int. Cl. G03c 5/04, 1/90
U.S. Cl. 96—27
2 Claims

ABSTRACT OF THE DISCLOSURE

An emulsion exposure package is made of a photosensitive emulsion on a glass plate and a reflecting surface on a base cemented to the emulsion by an ice water soluble coating of a vinyl acetal resin. The base with reflecting surface is removed by dissolving the coating in water at a temperature on the order of 5° C. A plurality of layers of emulsion may also be cemented together by a soluble coating, and may be mounted on or between glass plates. Several holograms may be recorded in the emulsions.

SUMMARY OF INVENTION

In many uses of photosensitive emulsions, it is frequently desirable to separate the emulsion from a base or layer to which it adheres. A cold water soluble coating, and especially a coating soluble in ice water, provides for separation of the emulsion from a base or separation of several layers of emulsion without effect on sensitivity of the emulsion. In Lippmann photography, it has been found practical to adhere the emulsion to a silver mirror surface on a base member by such a soluble coating, so that the base with the reflective surface may be removed from the emulsion for development and fixing. Emulsion layers may also be mounted between glass plates or in a plurality of layers for later separation before development in the same manner.

The foregoing and other objects, features and advantages of the present invention will be apparent from the following more particular description of the preferred embodiment of the invention as illustrated in the accompanying drawings.

Figure 1:
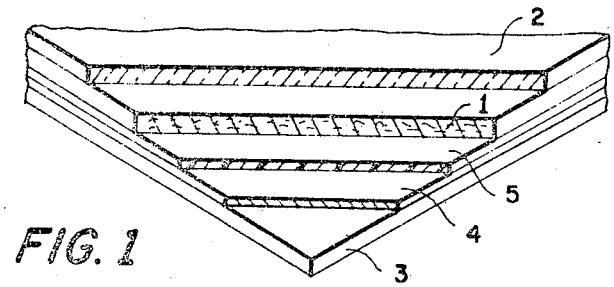
FIG. 1 is an exposure package embodying this invention.

The emulsion exposure package illustrated in FIG. 1 is in the form of a "sandwich" having the emulsion 1 between two glass plates 2 and 3, one of which has a silver reflective surface 4. An ice water soluble coating 5 between the reflective surface 4 and the emulsion 1 serves to cement the emulsion to the reflective surface. The glass base 2 is treated in the usual manner to assure adherence of the emulsion. The soluble coating is a vinyl acetal resin which dissolves below 15° C. and preferably about 5° C. Coating compositions of this type are fully described in Pat. No. 2,211,323.

This package is useful for Lippmann photography, in which light passing through the glass base 2 is reflected by the reflective coating 4 to form standing waves in the emulsion 1. After exposure, the coating 5 may be dissolved in ice water at a temperature of about 5° C., and the glass base 3 with the reflective coating 4 is then removed. The emulsion is then developed and fixed in the usual manner.

Figure 2:
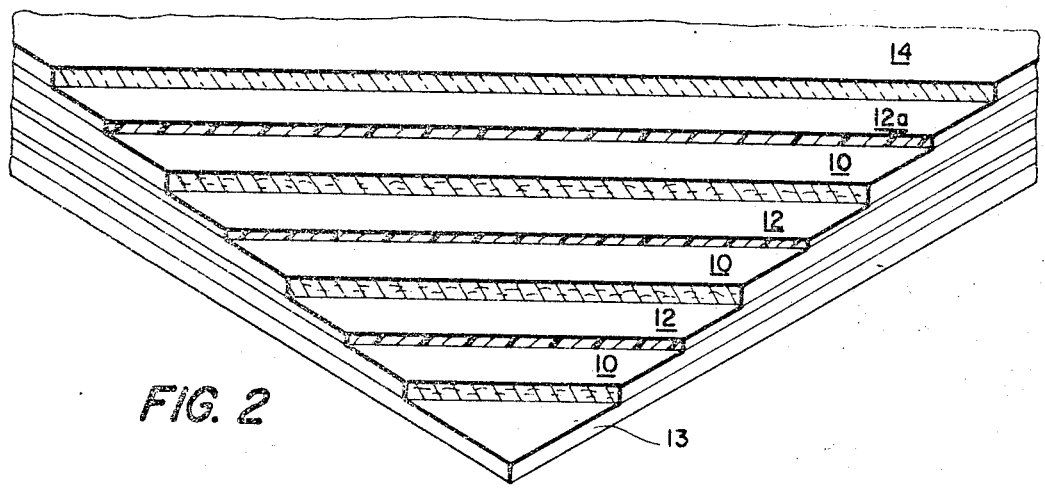
FIG. 2 is a modified form of package.

An exposure package may also be made up of several layers of emulsion 10, as shown in FIG. 2. The layers of emulsion are cemented together by the soluble coatings 12. These emulsion layers may be mounted between the glass plates 13, 14 for support, and at least one of the plates may be coated with a soluble coating 12a similar to the coatings 12, or the outer coatings may adhere directly to the glass bases. These glass plates are treated in a known manner, as by a silane coating, to adhere the emulsion to the glass.

Figure 3:
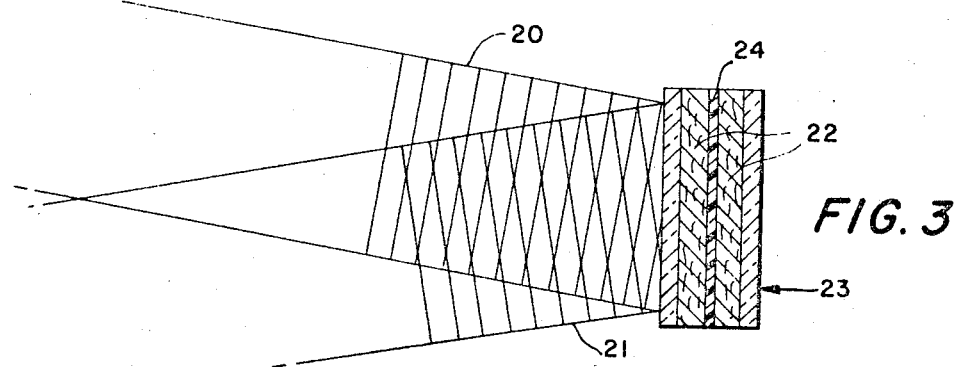
FIG. 3 illustrates diagrammatically a method of producing a hologram with the novel package.

The emulsion sandwiched between transparent glass plates, whether one or several, is adaptable to holographic recording. FIG. 3 illustrates diagrammatically the apparatus and operation. In holographic recording, an interference pattern is produced on a surface by two beams of substantially coherent light of the same frequency. One of the beams is a reference beam, the other beam which may, for example, be reflected from an object, is an information beam. The information, i.e., the image, may be reconstituted when the holograph is exposed to substantially coherent light of the same frequency as the original beams. In the arrangement shown, the beam 20 bearing information, as from an object, and the reference beam 21 form interference patterns in the emulsion layers 22 of the exposure package 23. The emulsion layers may then be separated by dissolving the coatings 24. When developed and fixed, each layer forms a complete hologram.

After the emulsion is separated from the package, and is developed and fixed, the hologram may then be "read out" or viewed by light of the recording wavelength.

Figure 4:
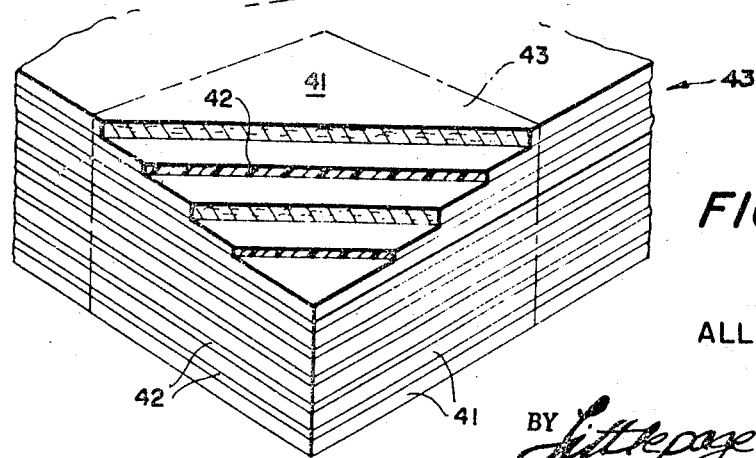
FIG. 4 illustrates the layer structure of emulsion in sheets and the formation of separate packages from the structure.

A package 40 of many layers 41 of emulsion may be constructed as illustrated in FIG. 4 for detecting the paths of nuclear particles, such, for example, as alpha particles. These layers of emulsion 41 separated by soluble coatings 42 may be stacked to several inches in thickness and formed in large sheets. The sheet is then cut by merely slicing the sheet, to form separate packages 43. Depending on the use to be made of the emulsion after exposure, the layers of a package may be separated by dissolving the coatings, marked by coded designations. These layers may also later be reassembled, in which case they may be marked, as by notches or transverse holes.

While preferred embodiments of the invention have been shown and described herein, it is to be understood that the invention is not limited to these embodiments or their details, and that departures may be made therefrom within the spirit and scope of the invention as defined in the appended claims.

I claim:

1. An exposure package comprising a transparent base member, a second base member, a plurality of similar uniformly transparent layers of a photosensitive emulsion between said base members, including at least one first layer on each base member and at least one layer between said first layers, and ice water soluble coatings between said layers of emulsion binding said layers together and between one of said base members and the adjacent layer so that said layers and said one of said base members may be readily separated after exposure by dissolving said coatings in ice water with duplicate images recorded on said layers.

2. The method of recording a plurality of holograms including exposing a package of layers of photosensitive emulsion bound together by soluble intermediate coatings to reference and information beams of substantially coherent light of the same frequency to form an interference pattern in each layer, dissolving the intermediate coatings to separate said layers, and developing and fixing said layers so that each layer forms a complete hologram.

References Cited

UNITED STATES PATENTS

| | | | |
|---|---|---|---|
| 1,116,479 | 11/1914 | Planchon | 96—83 |
| 1,905,188 | 4/1933 | Sease | 96—68X |
| 1,951,043 | 3/1934 | Weaver | 96—71X |
| 1,972,314 | 9/1934 | Rado | 96—68 |
| 2,126,137 | 8/1938 | Potter | 96—83X |
| 2,167,732 | 8/1939 | Ver Kinderen | 96—71X |
| 3,107,170 | 10/1963 | Netke | 92—27HX |

FOREIGN PATENTS

| | | | |
|---|---|---|---|
| 530,178 | 10/1949 | Canada | 96—83 |
| 912,277 | 12/1962 | Great Britain | 96—68 |

OTHER REFERENCES

R. E. Morris, The Physical Principles of Holography, pub. in Journal of Photographic Science, vol. 14, 1966, pp. 291–296 (inc.).

DAVID KLEIN, Primary Examiner

U.S. Cl. X.R.

96—83